United States Patent [19]

Crowley et al.

[11] Patent Number: 4,550,358
[45] Date of Patent: Oct. 29, 1985

[54] PROTECTIVE CIRCUIT FOR PORTABLE ELECTRIC APPLIANCES

[75] Inventors: George C. Crowley, Glenview; Gordon S. Carlson, Northbrook; Michael Woznicki, Westchester, all of Ill.

[73] Assignee: Sunbeam Corporation, Oak Brook, Ill.

[21] Appl. No.: 579,831

[22] Filed: Feb. 13, 1984

[51] Int. Cl.⁴ .............................................. H02H 3/16
[52] U.S. Cl. ..................................... 361/42; 361/178; 361/1; 307/118
[58] Field of Search .............................. 361/42, 47–50, 361/178, 179; 307/118, 326; 174/181, 14 R, 18; 340/604; 219/363, 295, 272, 292, 364, 369, 370, 373

[56] References Cited

U.S. PATENT DOCUMENTS

| | | | |
|---|---|---|---|
| 2,614,200 | 10/1952 | McNair | 361/42 X |
| 3,187,224 | 6/1965 | Messena . | |
| 3,215,896 | 11/1965 | Shattuck et al. . | |
| 3,325,718 | 6/1967 | McNulty . | |
| 3,368,110 | 2/1968 | Taylor . | |
| 3,369,153 | 2/1968 | Arnold et al. . | |
| 3,382,409 | 5/1968 | Assow et al. . | |
| 3,418,530 | 12/1968 | Cheever . | |
| 3,452,252 | 6/1969 | Mapham . | |
| 3,493,815 | 2/1970 | Hurtle . | |
| 3,600,634 | 8/1971 | Muench, Jr. . | |
| 3,624,449 | 11/1971 | Morgan . | |
| 3,813,578 | 5/1974 | Tiffany . | |
| 3,845,355 | 10/1974 | Lawson . | |
| 3,878,434 | 4/1975 | Voorhoeve . | |
| 3,968,407 | 7/1976 | Wilson . | |
| 4,023,072 | 5/1977 | Plasko | 361/50 |
| 4,270,158 | 5/1981 | Gilardoni et al. | 361/42 |
| 4,389,695 | 6/1983 | Carpenter, Jr. | 361/55 |
| 4,464,582 | 8/1984 | Aragaki et al. | 361/42 X |

*Primary Examiner*—Patrick R. Salce
*Attorney, Agent, or Firm*—Neil M. Rose; Clifford A. Dean

[57] ABSTRACT

A non-resettable water actuated circuit interrupting means for use with a portable electric appliance such as a hair dryer to provide protection for the user against injury in the event that the appliance is accidentally dropped in water or otherwise develops leakage current. Both sides of the line are fused and circuit means are provided which respond to leakage current in the appliance to provide separate circuits to blow out each of the fuses.

21 Claims, 3 Drawing Figures

PROTECTIVE CIRCUIT FOR PORTABLE ELECTRIC APPLIANCES

BACKGROUND OF THE INVENTION

There have been continuous efforts over the years to design portable electric appliances so that the user would be free of risk of accidental injury or death as a consequence of electric failures or current leakage conditions in such appliances. With the advent of plastic materials which are good electrical insulators and are strong from a structural standpoint, the goal of separating and insulating the user from the electrically energized portions of electrical appliances has been made much easier to achieve.

Most of the portable hand-held appliances which present the greatest risk to the consumer are provided with plastic housings which totally enclose any energized electric parts of the appliance. As long as the housing itself remains intact, there is little risk of the user contacting an electrically energized portion of the appliance even if there is an internal failure which might take the form of a lead wire shorted to the motor frame or some other similar fault or breakage. In spite of these improvements in the basic construction of portable appliances however, there is still one area in which studies show that there have been serious injuries and death to the user.

Studies indicate that the most serious risks relate to the use of portable electric appliances in the bathroom where there is water present and the user is often well grounded to receive the maximum injury from any leakage current from an appliance. The appliances typically involved in injuries in the bathroom are hair dryers hair curlers, styling wands, massagers and any other grooming appliance which might be plugged in while being handled by the user in the bathroom. Problems have typically arisen when a user will accidentally drop the hair dryer into a bathtub or sink and then seek to retrieve it without disconnecting the plug from the power outlet There have also been many instances in which children have been injured when playing with hair dryers in the bathtub. There are also serious risks involved in the use of many portable electric tools such as drills, saws, sanders, etc. since they are often used outside and in wet environments where electrical faults can present serious hazards. In such instances, the user is well grounded and offers a low impedance path for the leakage current and, as a consequence, fatalities have occurred. It should be appreciated that the current encountered by a user in such a situation is not large, usually less than one ampere with a 120 volt power supply. However, the heart may be seriously affected by such alternating currents if not interrupted promptly.

There have been many studies made to determine the nature of the dangers involved in immersing an electric appliance in water and studies of the types of injuries resulting therefrom. The nature of the leakage current produced in such an immersion situation varies considerably. Factors involved in the level of the leakage current through a person grasping an immersed appliance would be the magnitude of the supply voltage, the resistance of the water, the size and resistance of the person involved, the availability of a ground, and the current path as determined by the physical disposition of the appliance as compared to the location of the ground.

The resistance of normal tap water can vary anywhere from 1,000 to 100,000 ohm centimeters/square depending on the impurities found in any geographical area. The resistance of water in ohm centimeters/square can be calculated from available data on the average total dissolved solids in milligrams/liter. However, with an average resistance of 20,000 ohms at 120 volts, a leakage current of 35 milliamps might be considered average. Such a current is much too small to cause any tissue damage to a human being but, as was indicated above, is sufficient to incapacitate a person and after a period of time accelerate the heartbeat and cause death. The basic objective in any protective circuit is to respond in a reasonably short time to leakage currents which are sufficiently large to present risk of injury to humans.

There have been many attempts in the past to provide safety or protective circuits which would lessen or eliminate the hazards described above. In most cases, such attempts have been less than perfect in eliminating the risks and have been characterized by being complicated and expensive to construct. The typical portable electric hair dryer often sells for less than $10.00 while many of the proposed safety circuits would cost more than the hair dryer itself.

One of the common types of protective circuits is known as a ground fault interrupter circuit. Such a circuit is designed to sense and respond to the power which is actually passing from the controlled or regulated appliance to the ground. While this provides a protective approach to sensing and responding to the kind of leakage currents which are dangerous to humans, it requires that the appliance itself be well grounded. The sensing means would frequently include means for sensing the power which is lost or otherwise not delivered to the load. Such circuits are characterized by being complex, expensive and unsuitable for use with an inexpensive appliance which is normally used in a situation where it is ungrounded.

One early example of a prior art protective circuit is shown in the Hurtle U.S. Pat. No. 3,493,815 which is designed for use with a grounded two wire power system or a three phase system. The Hurtle patent employs a three wire conductor which may be connected between the appliance and a safety device interposed between the appliance and the power supply. In addition to the normal two power conductors, a third wire connects the motor frame to a triac which is triggered by a current flow from the load to short circuit the load through a line fuse to interrupt the circuit. In one embodiment of the Hurtle patent, there is a single line fuse, but in another there are fuses in both lines and two triacs to sense the current flow to the frame of the appliance from either side of the line. Since all of the embodiments of Hurtle designed for use with a two wire power supply have a grounded line, it should be recognized that a commercially acceptable protective circuit cannot depend on having a grounded line available in the normal domestic situation. Consequently, there are instances in which the Hurtle patent would not provide adequate protection. One such instance is in a situation in which one of the line fuses is blown as a consequence of the appliance being immersed in water. If the user were to then remove the appliance from the water and plug it in with a reversed polarity, the protective device of the Hurtle patent would be ineffective in blowing the second fuse and would leave the appliance still dangerous to the life of the user. In this particular instance, the appliance might still have sufficient water within the housing to provide enough leakage current to seriously injure or kill the user.

Other examples of prior art devices intended to protect the user from such injury are Gross U.S. Pat. No. 4,031,431 and Bienwald et al U.S. Pat. No. 4,412,193. The safety circuits disclosed in both of these patents are complicated and would be expensive to add to a portable home hair dryer.

SUMMARY OF THE INVENTION

The present invention represents a significant improvement over the prior art in that it is a water actuated circuit interrupter which is foolproof in its operation and which functions to blow both of the two line fuses in the event of a fault or high leakage current caused by immersion of the device in water. Both of the fused lines are provided with suitably connected sensing and short circuiting means which act to blow the fuse in the event of a leakage current in the device. The two fuses will blow quickly at the time of the initial current leakage situation.

The protective circuit includes a sensing plate or shield or other exposed terminal means mounted within the insulated housing of the appliance adjacent to or coextensive with the exposed element which is likely to be the source of leakage current as a consequence of the appliance being immersed in water. A remote plug-in module encloses the rest of the circuit and is connected to the appliance by a three wire cord. The three wire cord includes two normal power conductors for the appliance and a conductor connected to the sensing plate or terminal and extending to a voltage divider located within the plug-in module. The voltage divider serves to establish a voltage on the sensor plate or terminal which is approximately half of the line voltage. The voltage sensing means is connected across the line to respond to variations in the voltage of the sensing plate or terminal and to provide low impedance paths in parallel with the load so as to separately blow each of the two line fuses.

Accordingly, it is an object of the present invention to provide a low cost protective circuit for a portable electric appliance which will render the circuit inoperative in the event of a leakage current associated with the appliance mechanism.

It is a further object of the present invention to provide an improved protective circuit which will interrupt or disable both sides of the input power lines to the appliance in the event of a dangerous current leakage condition within the appliance.

It is another object of the present invention to provide an improved protective circuit which includes a remotely disposed plug-in module interconnected to an appliance by a three wire cord, whereby a circuit in the module senses a voltage change in the appliance in the event of current leakage within the appliance, said circuit then causing fuses in both sides of the line to blow.

It is still a further object of the present invention to provide an improved portable electric appliance having an insulated housing within which an exposed electrical element is surrounded by a spaced sensing plate which is at a potential intermediate the potential of the two power supply lines and which serves to sense any leakage current and cause a pair of line fuses to blow.

Further objects and advantages will become apparent as the following description proceeds and the features of novelty which characterize the invention will be pointed out in the claims annexed to and forming a part of the specification.

DESCRIPTION OF THE PREFERRED EMBODIMENT

The invention is disclosed herein as applied to a portable electric hair dryer, however, it should be understood that the teachings are applicable to almost any type of portable electric appliance including massagers, curling wands, radios, lamps and portable electric tools which are interconnected to a power outlet by a cord and which might conceivably be hazardous from an electrical standpoint in the event that they were immersed in water.

Figure 1:
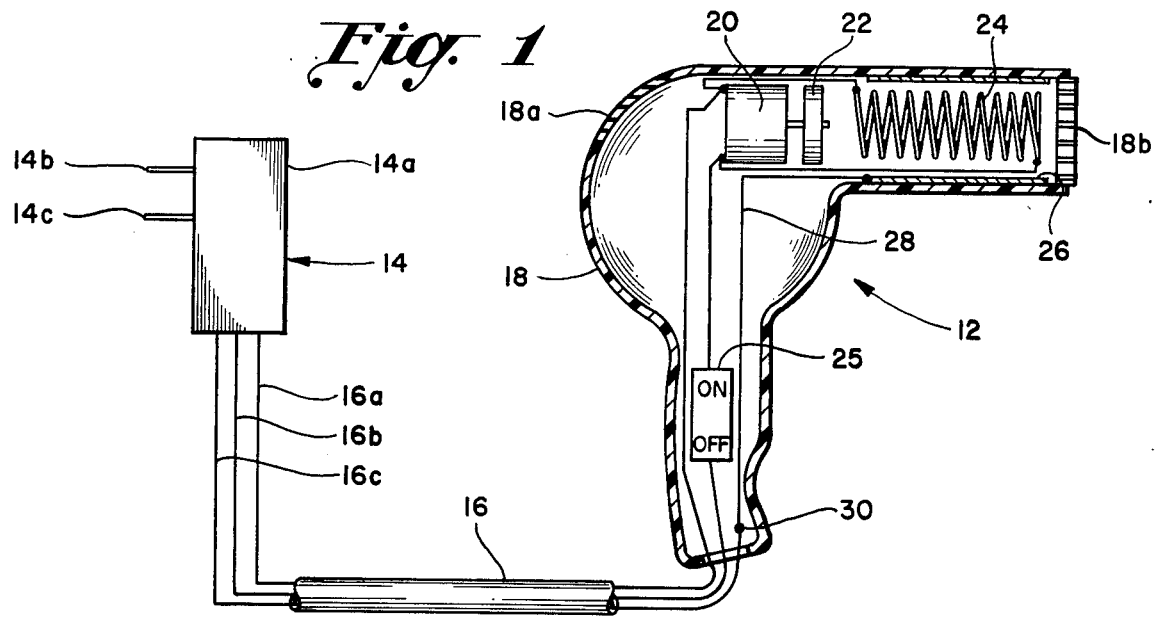
FIG. 1 is a schematic diagram showing the general arrangement of the major components of our invention as applied to a portable hair dryer.

Referring to FIG. 1, there is shown a schematic diagram of a hair dryer 12 which is interconnected to a plug-in module 14 by means of a three wire cord 16. The module 14 comprises a housing 14a made of a suitable plastic molded material and a pair of terminal pins 14b and 14c which are insertable into a conventional household electric outlet or receptacle. The module 14a would be about the same size and shape as the transformer adaptors which are conventionally used in recharging circuits for the batteries in portable calculators and the like.

Considering the hair dryer 12, it includes a housing 18 which is formed with air inlet openings 18a and air discharge openings 18b. In order to circulate and heat air within the housing 18, there is provided an electric motor 20 which drives a fan 22 producing air which flows across an exposed resistance heating element 24. In order to control the energization of the motor 20 and the heating element 24, there is typically provided an on/off switch 25 connected in series with one of the power leads 16a or 16b extending into the housing 18.

The heating element 24 typically takes the form of exposed coils of resistance wire which heat up when connected to a suitable power source. The coils of resistance wire are supported on electrically insulating members.

In the instant invention, the heater 24 is surrounded by a generally cylindrical tubular member 26 which is spaced from and electrically isolated from the heating element 24 and is substantially coextensive therewith. Within the housing 18 there is provided an uninsulated conductor wire 28 which is secured to the shield or sensing member 26 and extends lengthwise through the housing 18 into the handle to a connector 30 which is adjacent the end of the hair dryer where the cord 16 exits from the handle. A conductor 16c extends from the connector 30 within housing 18 to the module 14. It should be understood that the sensing member 26 may take many different forms from a simple exposed terminal or bare wire (as wire 28 described above) to the tubular member shown herein in connection with the embodiment of FIG. 2.

Figure 2:
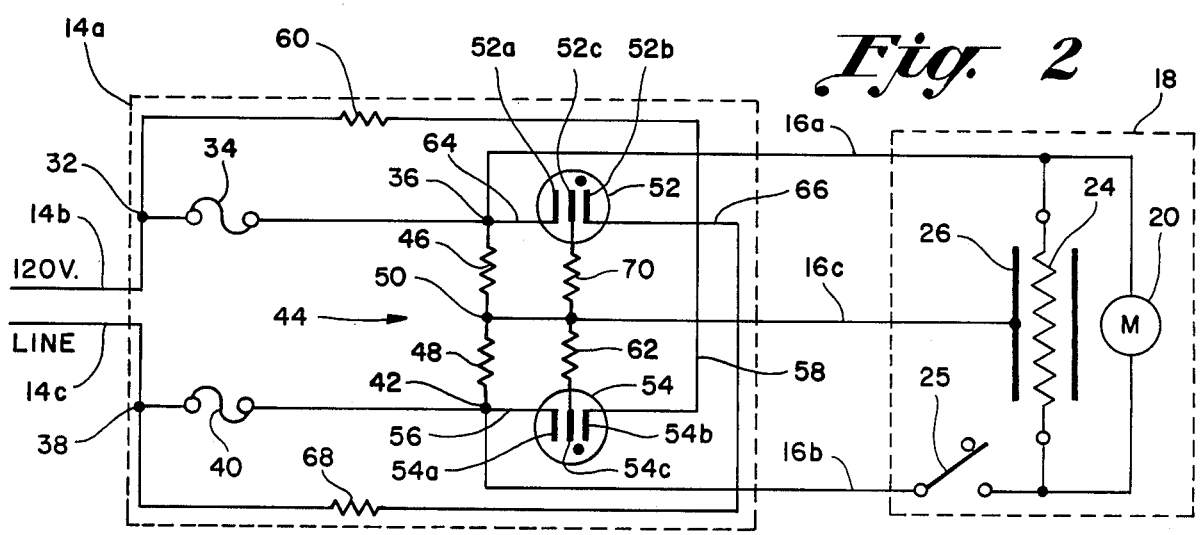
FIG. 2 is a schematic wiring diagram showing a first embodiment of our invention.

The circuit contained within the module 14 is shown schematically in FIG. 2 with the conductors 16a, 16b and 16c shown entering from the right side thereof. The terminal pins 14b and 14c are shown extending from the left side of the dotted line illustration of the housing 14a of the module 14. Connected between the terminal pin 14b and the lead 16a are an input terminal 32, a fuse 34, and an output terminal 36. As so connected, the fuse 34 is in series with the side of the line including the terminal pin 14b and the line 16a. Similarly, the other side of the line includes terminal pin 14c, an input terminal 38, a fuse 40 and an output terminal 42. In the disclosed embodiment, the fuses 34 and 40 were in the form of lengths of #30 gauge copper wire having a length of seven tenths of an inch.

In order to establish the sensing member or shield 26 at a potential less than the line voltage which, in the described embodiment, is 120 volts, there is provided a voltage divider 44 which includes a pair of serially connected 1 megohm resistances 46 and 48 connected between the output terminals 36 and 42. The divider 44 has a central or sensor terminal 50 at the interconnection of the resistances 46 and 48. With these equal resistances, the voltage at the sensor terminal 50 will be approximately 60 volts and the conductor 16c interconnects the terminal 50 with the sensor member or shield 26 to establish it at that 60 volt potential.

For the purpose of sensing any variation in the voltage of the sensing member which might be caused by a short or leakage current flowing from the heater 24 or other exposed electrical connections to the sensing member 26, there are provided two voltage sensing means which, in the embodiment of FIG. 2, comprise gas triodes 52 and 54. Each of these gas tubes 52 and 54 is provided with suitable connections to provide a low impedance path between one of the input terminals and the output terminal on the other side of the line. As will be explained in greater detail below, this arrangement permits the protective circuit of the instant invention to separately blow each of the fuses 34 and 40 whether or not the other one is still intact.

The circuit associated with the gas triode 54 includes lead 56 connecting one of the outer electrodes to the output terminal 42 and a lead 58 interconnecting the other outside terminal through a current limiting resistor 60 to the terminal 32. A center electrode 54c is connected to central terminal 50 through a 1,000 ohm resistance 62. The gas triode 54 is designed to break down and conduct between any pair of adjacent electrodes either 54a and 54c or 54b and 54c in the event the voltage across the electrodes exceeds 90 to 100 volts. When there is leakage current flowing between the sensor plate 26 and the heater 24, there will be an initial low current conduction and then an arc conduction or breakdown between two of these electrodes which will then cause a breakdown between the other two resulting in a low impedance path between the input terminal 32 and the output terminal 42 at which time the fuse 40 will blow.

The circuit associated with gas tube 52 is essentially the same as the one associated with tube 54 including a lead 64 interconnecting an outer electrode 52a with the output terminal 36 and a lead 66 interconnecting a second outer terminal 52b with the input terminal 38 through a series connected current limiting resistor 68. The center electrode 52c of the gas triode 52 is connected to the central terminal 50 through a coupling resistance 70. As with the tube 54, the gas triode 52 will also break down to provide a low impedance path between the output terminal 36 and the input terminal 38 in the event of a short or leakage current which provides the necessary breakdown voltage between the adjacent electrodes thereof.

An analysis of the circuit of FIG. 2 will reveal that it is always effective in blowing both fuses 34 and 40, thereby eliminating any possibility of injury to the user either at the time the initial fault develops or at some later time if a second attempt is made to operate the appliance after the initial failure. If we assume the initial leakage current occurs between lines 16b and 16c and that terminal 14c is at zero potential and terminal 14b at 120 volts, the voltage on sensing terminal 50 would drop causing an arc breakdown across elements 54b and 54c. This condition would then cause conduction across elements 54a and 54c reducing the resistance of gas triode 54 to close to zero with the current from terminal 38 through fuse 40 to terminal 32 being limited only by the resistor 60. This high current would blow the fuse 40 in the order of 0.133 milliseconds.

At the same time, drop in the voltage on sensing terminal 50 would produce an arc breakdown at terminals 52a and 52c causing conduction through gas triode 52 and the prompt blowing of fuse 34. While all tests have indicated a substantially coincident blowing of both of the fuses 34 and 40, it is clear from an examination of the circuit that the blowing of either fuse is not dependent on the presence of the other so it would still occur even if one blew an instant before the other.

Figure 3:
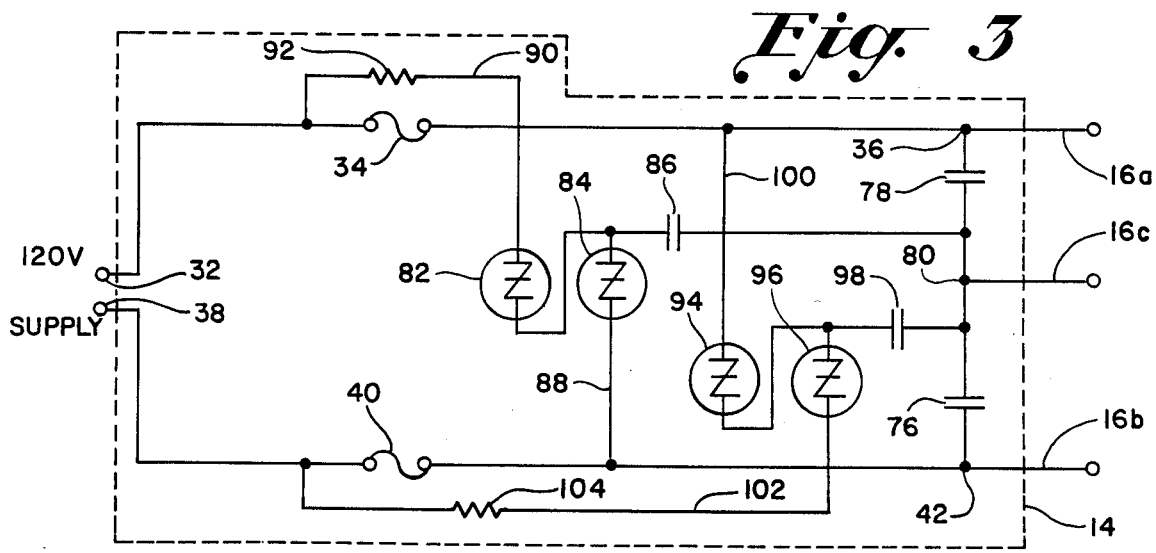
FIG. 3 is a schematic wiring diagram showing a second embodiment of our invention.

Referring now to FIG. 3, there is shown a second embodiment of the invention which utilizes sidacs rather than the gas triodes disclosed in the embodiment of FIG. 2. The sidac is a silicon bilateral voltage triggered switch marketed by Motorola Inc., by Shindengen of TOK-10, Japan and by Teccor Electronics, Inc. of Dallas, Tex. Upon application of a voltage exceeding the breakover voltage point, the sidac switches on through a negative resistance region to a low on-state voltage. Conduction continues until current is interrupted or drops below the required holding current level. The sidacs used in FIG. 3 would have a breakover voltage of on the order of 95 to 105 volts. In describing the embodiment of FIG. 3 we have used similar reference numerals to describe the identical parts it being understood that the module 14 and the hair dryer 12 would be identical to the earlier described embodiment and that there would be a three conductor cord including leads 16a, 16b and 16c interconnecting the hair dryer 12 with the module 14. We have also used the same reference numerals to describe the input terminals 32 and 38 and the output terminals 36 and 42 and the fuses 34 and 40.

In the embodiment of FIG. 3 connected between the output terminals 36 and 42 is a voltage divider which includes a pair of capacitors 76 and 78 which are joined at a central terminal 80 which is the sensor terminal connected by conductor 16c to the sensor member or shield 26. The capacitors 76 and 78 are 0.1 microfared capacitors.

The voltage sensing means associated with the input terminal 32 and the output terminal 42 includes a pair of sidacs 82 and 84 which are serially connected with the junction between the two sidacs coupled through a coupling capacitor 86 to the sensing terminal 80. The sidac 84 is connected through lead 88 to the output 42 while the sidac 82 is connected by a lead 90 through a current limiting resistor 92 to the input terminal 32.

Similarly, the input terminal 38 and output terminal 36 are provided with voltage sensing means including sidacs 94 and 96 which are serially arranged with the common connection tied to the sensing terminal 80 through a coupling capacitor 98. The sidac 94 is connected by lead 100 to the output terminal 36 while the sidac 96 is connected by lead 102 through a current limiting resistor 104 to the input terminal 38. As will be understood by those skilled in the art, the capacitive voltage divider including the capacitors 76 and 78 and the sidacs 82, 84, 94 and 96 function in the same manner as the circuit described above in connection with the embodiment of FIG. 2 in sensing the voltage change on the sensing member 26 resulting from a leakage current from the load and thereafter provide separate low impedance paths across the line through each of the fuses 34 and 40.

In connection with the lead 28 extending into the handle portion to connector 30, it should be understood that there might be an occasion in which the hair dryer 12 might be dropped into a sink in which the water was fairly shallow such that the shield 26 might not be immersed. By having an exposed terminal 30 adjacent the end of the hair dryer remote from the sensing means or shield 26, it is assured that once the hair dryer drops in water, the sensing circuit will be activated to disable both of the line fuses.

There is thus provided a circuit which has the same advantages of the circuit of FIG. 2 in assuring that both of the line fuses will be blown and assuring that the appliance will be rendered completely inoperative in the event of immersion in water or being subjected to some other current leakage condition. The parts and components involved in the circuit of the instant invention are relatively inexpensive and easy to install as compared to the devices known in the prior art. There is little modification which must be made to the hair dryer itself other than the lead connected to the shield surrounding the heater and the provision of the three wire cord extending to the plug-in module. The components contained in the module itself are compact and inexpensive providing a plug which is only slightly larger than a normal appliance plug.

In connection with the design criteria to be followed in regard to the circuit of the instant invention, it is noted that the embodiments of FIGS. 2 and 3 were designed so that the potential of the sensing means or shield 26 and the sensing terminals 50 or 80 was to be 60 volts or approximately mid-way between two sides of the input voltage. It should be appreciated that the use of this mid-point voltage permits economies in the components which may be used but does not represent any absolute limit in the design approach to be taken. If the voltage of the sensing plate were chosen to be either 40 or 80 volts, there would be a little more likelihood that tolerance variations in the components might result in a circuit which would provide breakdown when there was no leakage current or failure.

In addition, it is important to have a circuit which will operate when the line voltage is no more than 105 volts. The combination of accommodating normal variations in the resistors, capacitors, sidacs and gas triodes and assuring breakdown at voltages down to 105 volts is primarily what dictates designing the voltage of the sensing plate to be 60 volts or halfway between the line voltage and zero. If expensive components manufactured to closer tolerances were used, there would be no reason why the design voltage for the sensor plate could not be anywhere between 40 and 80 volts for a 120 volt power supply.

In considering the magnitude of the currents and times of applying such currents to a human to cause a life endangering situation, reference may be made to the publication, *Development of Test Equipment and Methods for Measuring Potentially Lethal and Otherwise Damaging Current Levels* published in 1981 by Underwriters Laboratories in cooperation with the Consumer Product Safety Commission. This publication indicates that the current levels necessary to cause ventricular fibrillation of the heart which might result in death vary for men, women and children. The lowest level which might produce this condition in children is 20 milliamps when continued for a period of three seconds. However, if the duration of the current is limited to one-tenth of a second, then the size of the current may be multiplied by 10 producing a current of 200 milliamps. Our circuit is capable of responding in a time on the order of 0.133 seconds. This same publication has indicated that the impedance of a well grounded child is on the order of 1200 ohms. Thus, such a child, when well grounded across a 120 volt circuit, would only draw about 100 milliamps. It is also noted that the sensing circuit of the present invention is sensing leakage current within the insulated housing of the hair dryer in close proximity to the source. Therefore, there is little likelihood that a child could be subjected to even the maximum 100 milliamps prior to the sensing circuit of the instant invention becoming operative.

Although we have disclosed our invention in a form in which the protective circuit is enclosed in a remote module 14, it should be understood that it could be located within the appliance if it were suitably sealed against moisture. Thus, by completely potting the circuit in epoxy or comparable material, we can provide a circuit which would disable the appliance even if it were immersed along with the appliance.

In view of the foregoing, it is evident that applicants' circuit provides an inexpensive means of meeting the current requirements for a water immersion circuit interrupter which would safeguard appliances such as hair dryers for use by children in normally dangerous circumstances.

What is claimed as new and desired to be secured by Letters Patent of the United States is:

1. A portable appliance having a protective circuit comprising, a remote circuit module having a three wire cord interconnecting said module with an electric appliance, said appliance having an electrically insulating housing enclosing an open electrical element, a sensor member of electrically conducting material mounted in said housing in proximity to but spaced from said element, first and second input terminals on said module adapted for connection to a source of electrical power, first and second load terminals in said module each connected by an insulated conductor to supply power to said element in said appliance, an insulated conductor extending from a sensor terminal in said module into connection with said sensor member in said appliance, means in said module connected to said sensor terminal to establish a voltage on said sensor member at a level less than the voltage across said load terminals when said input terminals are connected to a source of power, overload fuses in said module connected between said first input and load terminals and between said second input and load terminals, sensing means in said module which responds to changes in the voltage of said sensor member to short circuit the power to said input terminals through each one of said fuses separately.

2. The combination of claim 1 wherein said sensing means responds to current flow from said element to said sensor member to blow both of said fuses in said module.

3. The combination of claim 1 wherein said sensing means comprises first and second bypass circuits connected in parallel with said element, said first bypass circuit being connected between said first input terminal and said second load terminal, said second bypass circuit being connected between said second input terminal and said first load terminal, the response of said sensing means to changes in the voltage of said sensor member causing a decrease in the impedance of said first and second bypass circuits to short circuit said input terminals through each of said fuses separately to assure the blowing of both fuses.

4. The combination of claim 3 wherein each of said bypass circuits comprise a pair of series connected sidacs, said means for establishing a voltage on said sensor member including a voltage divider connected across said load terminals with an intermediate voltage terminal connected to said sensor terminal, the junction of each pair of sidacs being connected to said sensor terminal.

5. The combination of claim 3 wherein each of said bypass circuits comprises at least one high impedance circuit element which may be triggered into a conduction low impedance state by a change in the voltage on said sensor member to which said circuit element is connected.

6. The combination of claim 5 wherein said circuit element comprises a gas triode having a central electrode and two outer electrodes with the voltage between the central and either outer electrode causing breakdown, said central electrode being connected to said sensor terminal and the outer electrodes being connected one to an input terminal and one to a load terminal.

7. The combination of claim 1 wherein the voltage on said sensor member is equal to approximately one half the voltage across said load terminals.

8. The combination of claim 1 wherein said sensor member comprises a generally cylindrical shield which is spaced from but encloses the open resistance heating element, said shield being formed of a conducting material and being totally enclosed within said insulating housing.

9. The combination of claim 8 wherein said housing is elongated and said heating element is mounted at one end of said housing, a conductor connected to said shield and extending to adjacent the other end of the housing from the end in which the heating element and shield are mounted, said conductor being uninsulated at said other end to provide exposure to and contact with water which might accidentally be present within said housing.

10. The combination of claim 1 wherein said module comprises an insulating housing supporting a pair of terminal pins adapted to be inserted into a household power outlet whereby said pins will support said module with respect to said outlet, said terminal pins being said input terminals.

11. An appliance having means for protecting the user from leakage currents resulting from water immersion comprising an insulated housing enclosing an electrically operated power consuming device, an internal sensing member of electrically conducting material enclosed within said housing but exposed to water which may accidentally enter into said housing, means for applying a voltage to said sensing member at a level equal to approximately one half the voltage applied to said power consuming device, sensing means for sensing the change in voltage on said sensing member as a consequence of current leakage from said device to said sensing member, a two conductor power supply cord connected to said device, fuses in series with each of said conductors, said sensing means being operative in the event of such leakage current to establish two low impedance paths in parallel with said device, one through each of said fuses to blow each fuse independently of the other.

12. In combination with a portable electric hair dryer having an electrically insulating housing enclosing a motor driven fan and an electric heating element for heating the air circulated by the fan, a water actuated interrupting circuit comprising a conducting shield surrounding and electrically insulated from said heating element, first and second input terminals adapted for connection to a source of electrical power, first and second load terminals connected to supply power to said motor and heating element, means electrically connecting said first input terminal with said second load terminal through a first fuse, means electrically connecting said second input terminal with said first load terminal through a second fuse, said first and second fuses each having a current rating at least equal to the load current consumed by said motor and heating element, a voltage divider connected across said load terminals having a central terminal providing a voltage intermediate the voltage applied to said input terminals, said central terminal being connected to said shield a first voltage sensing means connected between said first input terminal and said second load terminal, second voltage sensing means connected between said second input terminal and said first load terminal, said voltage sensing means being responsive to changes in voltage at said central terminal to provide a low resistance path between the respective terminals to which each is connected to blow the fuse connected to the respective output terminal to which each is connected.

13. The combination of claim 12 wherein said input and load terminals and said voltage sensing means and voltage divider and fuses are contained in a separate module adapted to be plugged into a power outlet, an elongated three conductor cord extending between said module and said insulating housing, two of the conductors of said cord interconnecting said load terminals with said motor and heating element, the third one of said conductors connecting said central terminal with said shield.

14. The combination of claim 13 wherein said housing is elongated having a handle at one end and said heating element is displaced toward the other end, said shield being coextensive with said heating element and being displaced toward said other end, an exposed conductor within said housing connected to said shield and extending to adjacent the handle end of said housing.

15. A protective circuit for use with portable electric appliance comprising a pair of input terminals adapted for connection to a source of alternating current power, a pair of load terminals connected to a load, means connecting each said input terminal to a load terminal including a fuse in circuit with said connecting means between a load terminal and an input terminal, said fuses each having a current rating at least equal to the normal load current when said terminals are connected to a power source, conductive sensing means located in spaced proximity to said load to provide a current path shunting said load in the event of moisture or other means causing faults or leakage in said load, a voltage divider connected in parallel with said load and having a central terminal which is connected to said sensing means, a voltage sensing means connected between each load terminal and the input terminal on the other side of the load, each said voltage sensing means being connected to said central terminal in said voltage divider to sense changes in the voltage of said central terminal with respect to either of its respective input and load terminals, each said voltage sensing means providing a low resistance path between one of said input terminals and the load terminal remote from said one input terminal to provide a current sufficiently large to blow the fuse connected to said remote load terminal.

16. The combination of claim 15 wherein each said low resistance path includes a current limiting resistor.

17. The combination of claim 15 wherein each said voltage sensing means comprises a pair of sidacs with one connected between said central terminal and an input terminal and the other connected between said central terminal and the load terminal remote from said input terminal.

18. The combination of claim 17 wherein a coupling capacitor is used to connect each of said voltage sensing means to said central terminal.

19. The combination of claim 15 wherein each said voltage sensing means comprises a gas triode having a first pair of voltage responsive elements connected to said central terminal and an input terminal and second pair of voltage responsive elements connected to said central terminal and a load terminal remote from the input terminal connected to said first pair, the element of each pair connected to said central terminal being a common element.

20. The combination of claim 19 wherein said common terminal of each said voltage sensing means is coupled to said central terminal by a resistor means.

21. The combination of claim 20 wherein the element of each of said triodes connected to one of said input terminals is connected through a current limiting resistor.

* * * * *